US009386557B2

(12) United States Patent
Tenny

(10) Patent No.: US 9,386,557 B2
(45) Date of Patent: Jul. 5, 2016

(54) METHOD AND APPARATUS FOR SUPPORTING BROADCAST AND MULTICAST SERVICES IN A WIRELESS COMMUNICATION SYSTEM

(75) Inventor: Nathan Edward Tenny, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 667 days.

(21) Appl. No.: 12/190,441

(22) Filed: Aug. 12, 2008

(65) Prior Publication Data

US 2009/0047942 A1 Feb. 19, 2009

Related U.S. Application Data

(60) Provisional application No. 60/955,620, filed on Aug. 13, 2007.

(51) Int. Cl.
*H04W 72/00* (2009.01)
*H04L 12/18* (2006.01)
*H04W 4/06* (2009.01)

(52) U.S. Cl.
CPC ......... *H04W 72/005* (2013.01); *H04L 12/1881* (2013.01); *H04L 12/189* (2013.01); *H04W 4/06* (2013.01)

(58) Field of Classification Search
USPC ......................................................... 370/252
See application file for complete search history.

(56) References Cited

U.S. PATENT DOCUMENTS

| 6,421,706 B1 | 7/2002 | McNeill et al. |
| 6,501,745 B1 | 12/2002 | Turina et al. |
| 6,957,071 B1 | 10/2005 | Holur et al. |
| 6,978,144 B1 | 12/2005 | Choksi |

(Continued)

FOREIGN PATENT DOCUMENTS

| CN | 1910841 A | 2/2007 |
| EP | 1507358 A2 | 2/2005 |

(Continued)

OTHER PUBLICATIONS

International Search Report and the Written Opinion—PCT/US2008/073068, International Search Authority—European Patent Office—May 12, 2009.

(Continued)

*Primary Examiner* — Adnan Baig
(74) *Attorney, Agent, or Firm* — Anthony R. Morris

(57) ABSTRACT

Techniques for support broadcast and multicast services in a wireless communication system are described. In an aspect, a transmitter (e.g., a Node B) sends configuration information conveying a mapping of long service identifiers (IDs) to short service IDs for advertised services. The transmitter also sends scheduling information conveying a mapping of short service IDs to radio resources used for scheduled services in the current scheduling period. The short service IDs reduce the amount of scheduling information to send. In another aspect, the transmitter sends information identifying services being transmitted and services being advertised but not transmitted. Receivers (e.g., UEs) may use this information to determine whether or not to send requests for services of interest. In yet another aspect, the transmitter sends configuration information for services being advertised but not transmitted. This may allow the transmitter to start these services quicker when requested by the receivers.

26 Claims, 11 Drawing Sheets

(56) References Cited

U.S. PATENT DOCUMENTS

| | | | |
|---|---|---|---|
| 7,346,339 B2 | 3/2008 | Lee et al. | |
| 7,349,703 B2 | 3/2008 | Yi et al. | |
| 7,499,435 B2 | 3/2009 | Kwak et al. | |
| 7,558,228 B2 | 7/2009 | Lee et al. | |
| 2004/0087320 A1 | 5/2004 | Kim et al. | |
| 2004/0103435 A1 | 5/2004 | Yi et al. | |
| 2004/0223623 A1 | 11/2004 | Lo | |
| 2004/0228294 A1 | 11/2004 | Kim et al. | |
| 2004/0229605 A1* | 11/2004 | Hwang et al. | 455/426.1 |
| 2004/0229629 A1* | 11/2004 | Yi et al. | 455/452.2 |
| 2005/0037768 A1 | 2/2005 | Hwang et al. | |
| 2005/0074024 A1* | 4/2005 | Kim et al. | 370/432 |
| 2006/0030342 A1* | 2/2006 | Hwang | H04N 21/21 455/466 |
| 2006/0068793 A1* | 3/2006 | Van Lieshout et al. | 455/444 |
| 2006/0126556 A1* | 6/2006 | Jiang | H04L 12/18 370/328 |
| 2006/0126590 A1 | 6/2006 | Putcha et al. | |
| 2006/0146745 A1 | 7/2006 | Cai et al. | |
| 2006/0156370 A1* | 7/2006 | Parantainen | 725/132 |
| 2007/0054625 A1 | 3/2007 | Beale | |
| 2007/0058595 A1 | 3/2007 | Classon et al. | |
| 2007/0086437 A1* | 4/2007 | DiFazio | H04L 12/189 370/352 |
| 2007/0275728 A1 | 11/2007 | Lohr et al. | |
| 2007/0293229 A1 | 12/2007 | Khan | |
| 2008/0285523 A1 | 11/2008 | Bjorken | |
| 2009/0010196 A1* | 1/2009 | Bui | H04L 5/0007 370/312 |
| 2009/0016254 A1 | 1/2009 | Lee et al. | |
| 2009/0046617 A1 | 2/2009 | Tenny et al. | |
| 2009/0180414 A1 | 7/2009 | Maeda et al. | |
| 2009/0225708 A1 | 9/2009 | Harada et al. | |
| 2009/0262699 A1 | 10/2009 | Wengerter et al. | |
| 2009/0291692 A1 | 11/2009 | Kazmi et al. | |
| 2009/0305712 A1* | 12/2009 | Franceschini | H04W 52/08 455/450 |
| 2010/0002617 A1 | 1/2010 | Seyama | |
| 2010/0046409 A1* | 2/2010 | Lohmar et al. | 370/312 |
| 2010/0062795 A1* | 3/2010 | Lee | 455/458 |
| 2010/0232333 A1 | 9/2010 | Higuchi et al. | |
| 2011/0243056 A1 | 10/2011 | Jen | |
| 2014/0044093 A1 | 2/2014 | Tenny et al. | |

FOREIGN PATENT DOCUMENTS

| | | |
|---|---|---|
| EP | 1521394 A1 | 4/2005 |
| EP | 1585351 | 10/2005 |
| EP | 1665654 A2 | 6/2006 |
| JP | 2006526352 | 11/2006 |
| KR | 20050106845 A | 11/2005 |
| RU | 2233045 C2 | 7/2004 |
| RU | 2003129811 A | 4/2005 |
| RU | 2004138290 | 6/2005 |
| TW | 200522578 | 7/2005 |
| WO | WO9923844 | 5/1999 |
| WO | 0207162 A1 | 1/2002 |
| WO | 03065648 A2 | 8/2003 |
| WO | WO03088570 A1 | 10/2003 |
| WO | WO03101141 A1 | 12/2003 |
| WO | WO2004017540 A1 | 2/2004 |
| WO | WO2004102831 A1 | 11/2004 |
| WO | 2005027391 A2 | 3/2005 |
| WO | WO2005099133 A1 | 10/2005 |
| WO | WO2005101681 A1 | 10/2005 |
| WO | WO2006104335 A2 | 10/2006 |
| WO | WO2007023045 A1 | 3/2007 |
| WO | WO2007052916 A1 | 5/2007 |
| WO | WO2007052921 A1 | 5/2007 |
| WO | 2008049449 A1 | 5/2008 |

OTHER PUBLICATIONS

LG Electronics: "LTE MBMS Transmission R2-071922" 3GPP TSG-RAN WG2 #58, May 11, 2007, pp. 1-2, XP002495415.

Taiwanese Search report—097130807—TIPO—Aug. 15, 2011.

Universal Mobile Telecommunications System (UMTS); Introduction of the Multimedia Broadcast/Multicast Service (MBMS) in the Radio Access Network (RAN); Stage 2 (3GPP TS 25.346 version 7.3.0 Release 7); ETSI TS 125 346 ETSI Standards, LIS, Sophia Antipolis Cedex, France, vol. 3-R2, No. V7.3.0, Mar. 1, 2007, XP014037922 ISSN: 0000-0001 pp. 15-16 pp. 23,31,46.

Universal Mobile Telecommunications System (UMTS); Radio Resource Control(RRG); Protocol specification (3GPP TS 25.331 version 7.4.0 Release 7); ETSI. TS 125 331 ETSI Standards. LIS, Sophia Antipolis Cedex. France, vol. 3-R2, No. V7.4.0, Mar. 1, 2007, XP014037920 ISSN: 0000-0001 pp. 46,72-73 pp. 384-385 pp. 389-390 pp. 96,4.

Yuan Yuan et al., "A Secure Service Discovery Protocol for MANET," The 14th IEEE 2003 International Symposium on Personal, Indoor and Mobile Radio Communication Proceedings, pp. 502-506.

Alcatel-Lucent, "Transmission of E-MBMS control information," 3GPP TSG-RAN WG2 #58bis R2-072357,Jun. 25, 2007.

Ericsson, "MBMS Service Announcement," 3GPP TSG-RAN WG2 #58bis R2-072573,Jun. 25, 2007.

Nokia Siemens Networks, Nokia, "MCCH Control Signalling," 3GPP TSG-RAN WG2 #58bis R2-072410,Jun. 25, 2007.

NSN, Nokia, "MCCH Control," 3GPP TSG-RAN WG2 #58 R2-071734,May 7, 2007.

3GPP TS 36.300, "Evolved Universal Terrestrial Radio Access (E-UTRA) and Evolved Universal Terrestrial Radio Access Network (E-UTRAN); Overall description; Stage 2 (Release 8)", V8.0.0, Mar. 2007.

* cited by examiner

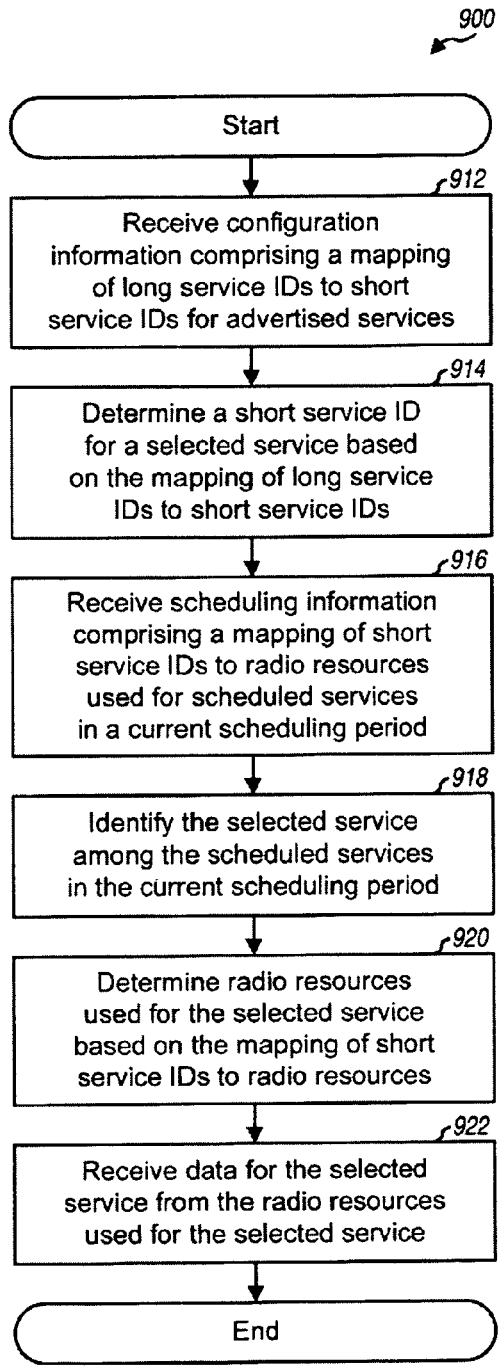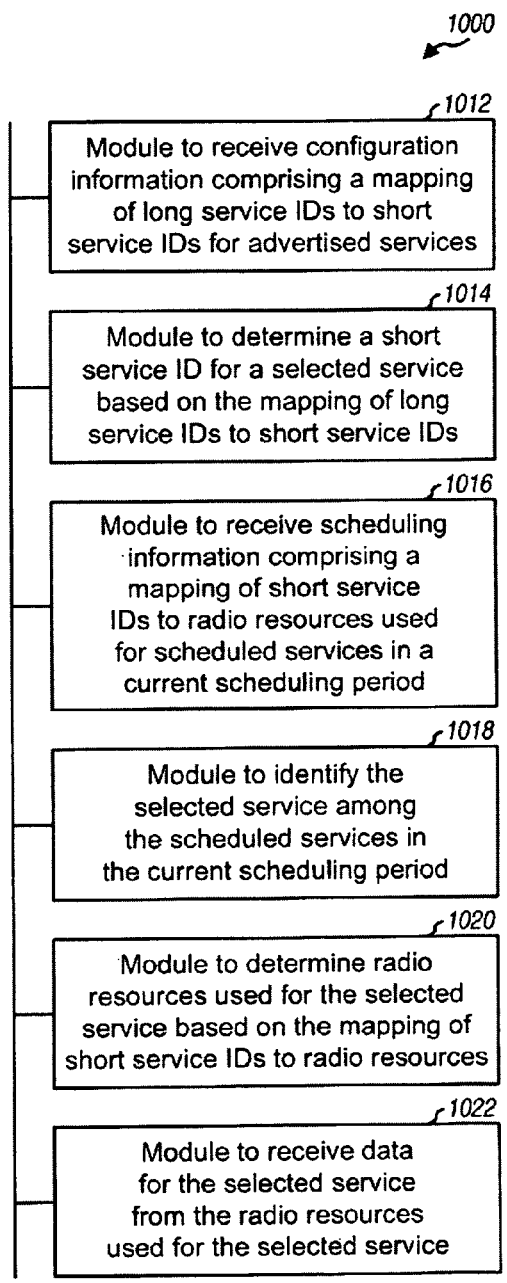
FIG. 9
FIG. 10

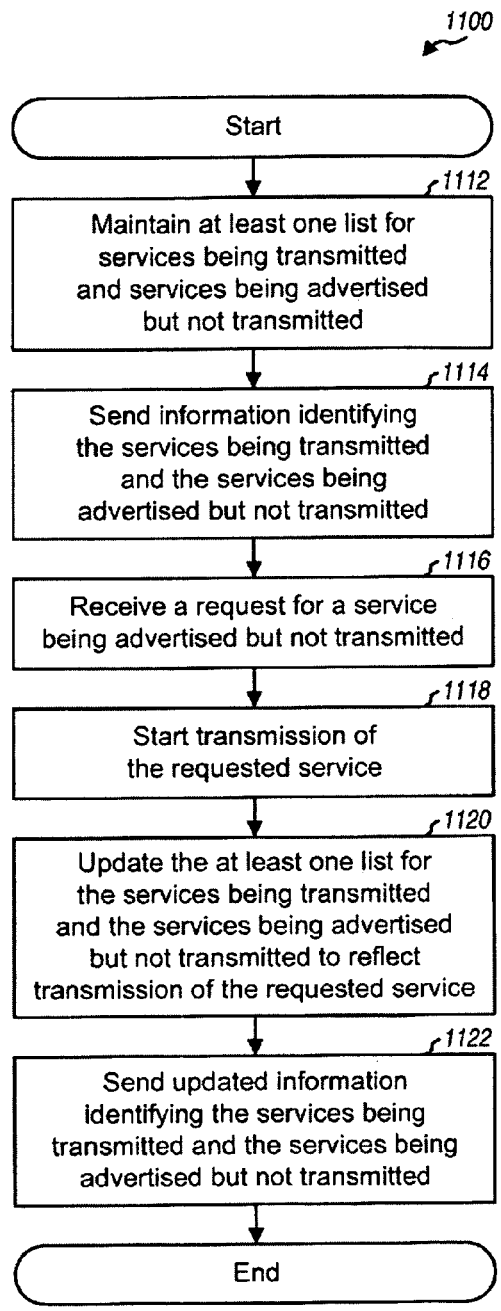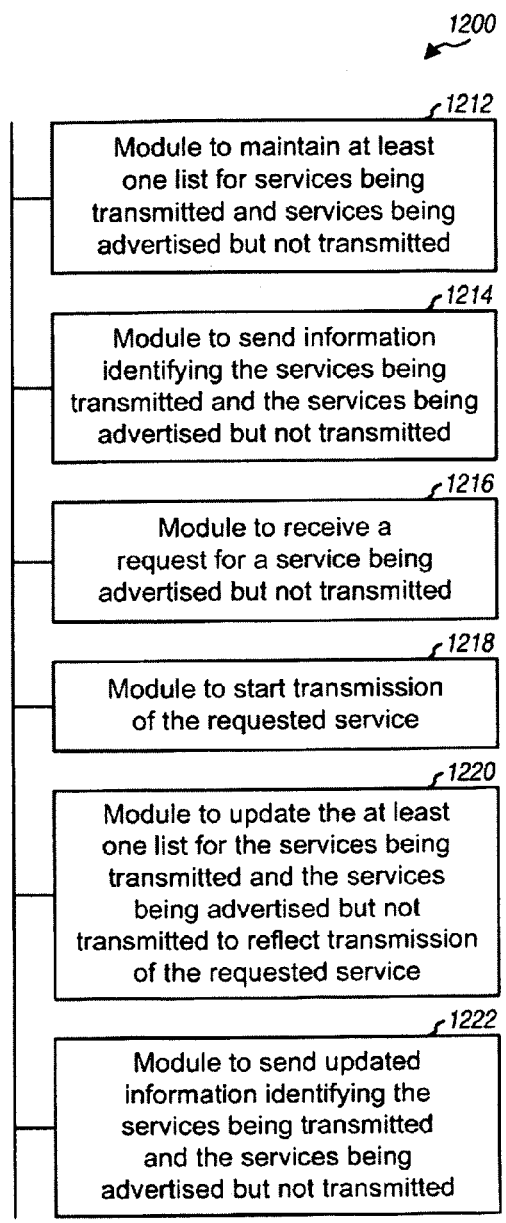
*FIG. 11*  *FIG. 12*

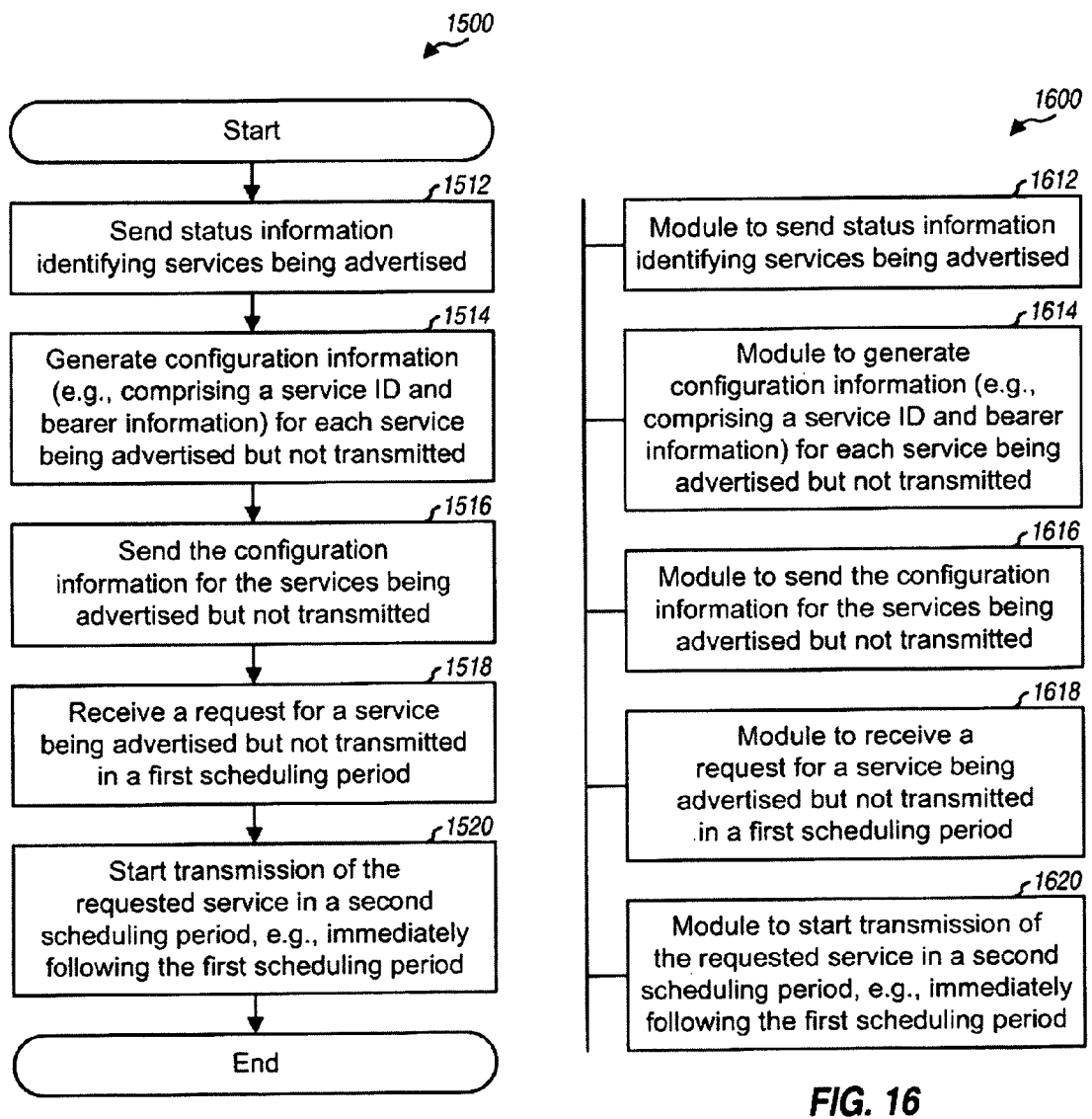

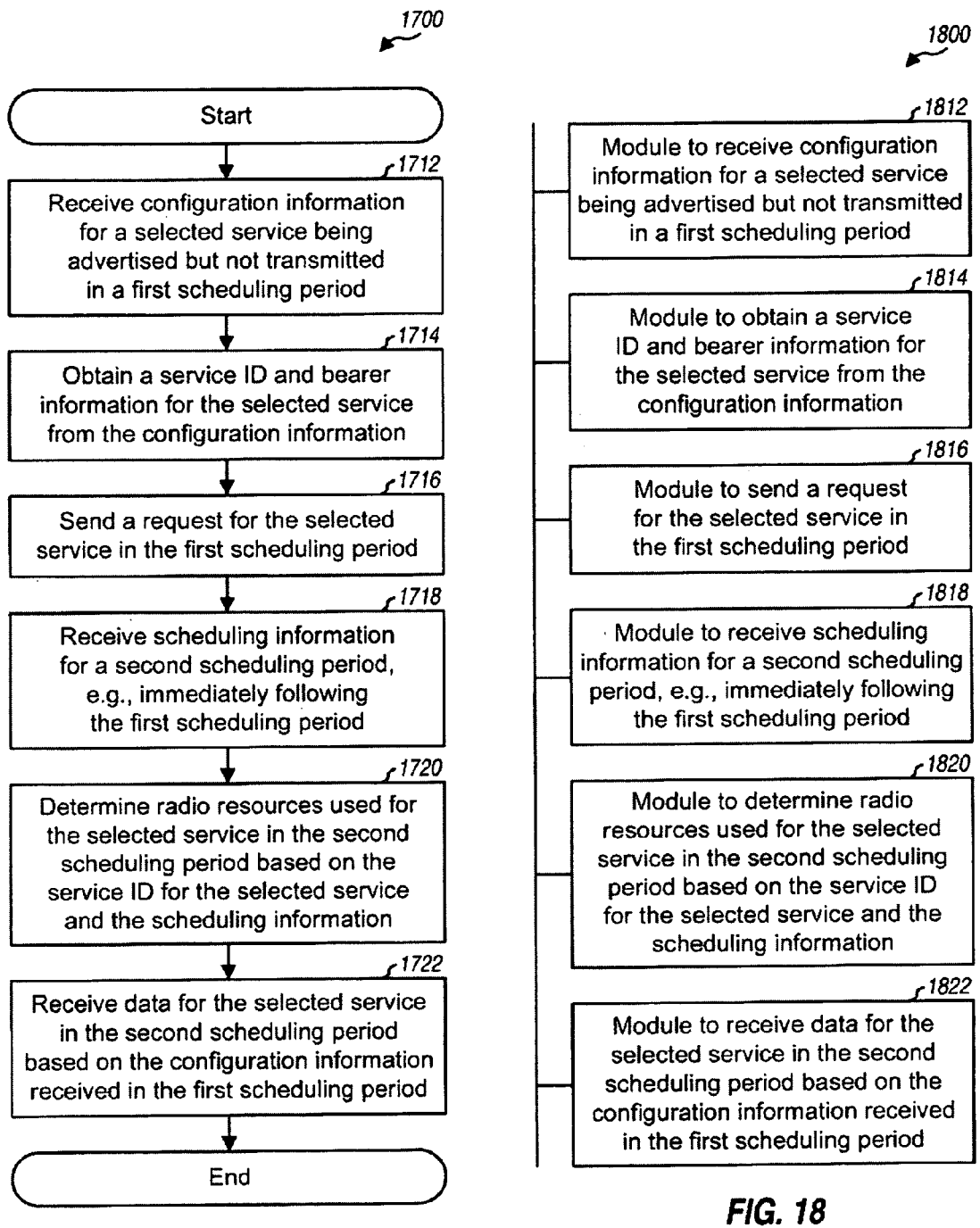

METHOD AND APPARATUS FOR SUPPORTING BROADCAST AND MULTICAST SERVICES IN A WIRELESS COMMUNICATION SYSTEM

The present application claims priority to provisional U.S. Application Ser. No. 60/955,620, entitled "ACCESSING AN ADVERTISED SERVICE IN A MULTIMEDIA SYSTEM," filed Aug. 13, 2007, assigned to the assignee hereof and incorporated herein by reference.

BACKGROUND

I. Field

The present disclosure relates generally to communication, and more specifically to techniques for supporting broadcast and multicast services in a wireless communication system.

II. Background

Wireless communication systems are widely deployed to provide various communication services such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may support broadcast and multicast services. A broadcast service is a service that may be received by all users, e.g., a news broadcast service. A multicast service is a service that may be received by a group of users, e.g., a subscription video service. A given broadcast or multicast service may be received by any number of users at any given moment. It is desirable to efficiently support broadcast and multicast services in the system.

SUMMARY

Techniques for support broadcast and multicast services in a wireless communication system are described herein. In an aspect, a transmitter (e.g., a Node B) may send configuration information comprising a mapping of long service identifiers (IDs) to short service IDs for advertised services. The transmitter may also send scheduling information comprising a mapping of short service IDs to radio resources used for scheduled services in the current scheduling period. The long service IDs may be used to identify all supported services. The short service IDs may be used to identify scheduled services in the scheduling information. Using the short service IDs instead of the long service IDs may reduce the amount of scheduling information to send.

In another aspect, a transmitter may send information identifying services being transmitted and services being advertised but not transmitted. This information may be used by receivers (e.g., user equipments (UEs)) to determine whether or not to send requests for services of interest to these receivers.

In yet another aspect, a transmitter may send configuration information for services being advertised but not transmitted. The configuration information for each such service may include a short service ID for the service and bearer information used to receive the service if transmitted. The transmitter may receive a request for a service being advertised but not transmitted during a scheduling period. The transmitter may start transmission of the requested service in the next scheduling period. By sending configuration information for advertised services, the transmitter can quickly start these services when requested by receivers.

Various aspects and features of the disclosure are described in further detail below.

BRIEF DESCRIPTION OF THE DRAWINGS

FIGS. 9 and 10 show a process and an apparatus, respectively, for receiving configuration information and scheduling information for services.

FIGS. 11 and 12 show a process and an apparatus, respectively, for sending information identifying services being advertised but not transmitted.

FIGS. 15 and 16 show a process and an apparatus, respectively, for sending configuration information for advertised services.

FIGS. 17 and 18 show a process and an apparatus, respectively, for receiving configuration information for advertised services.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). The techniques may also be used for broadcast systems, which may implement MediaFLO™, Digital Video Broadcasting for Handhelds (DVB-H), Integrated Services Digital Broadcasting for Terrestrial Television Broadcasting (ISDB-T), etc. For clarity, certain aspects of the techniques are described below for LTE, and LTE terminology is used in much of the description below.

Figure 1:
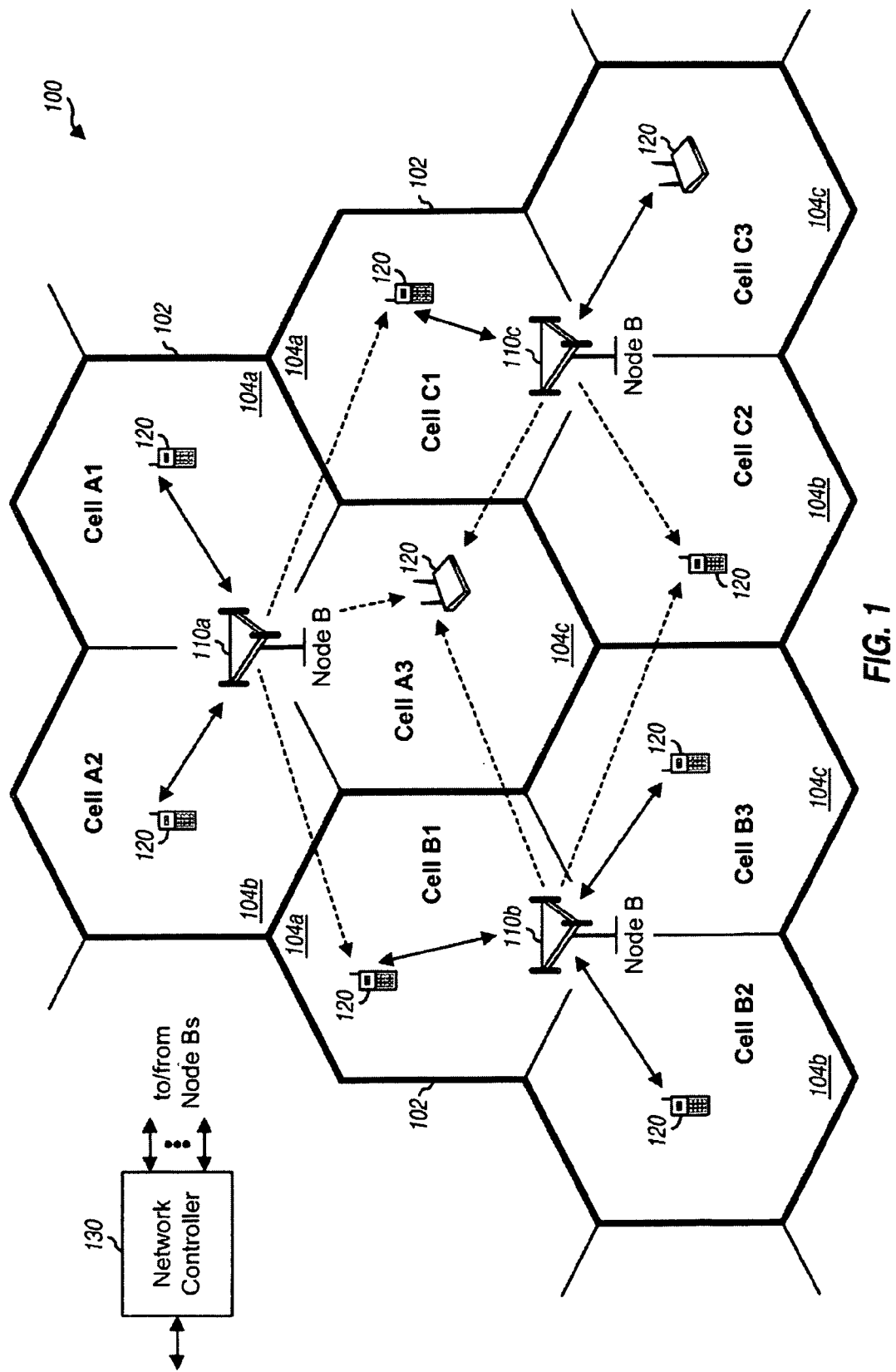
FIG. 1 shows a wireless communication system.

FIG. 1 shows a wireless communication system 100, which may be an LTE system. System 100 may include a number of Node Bs and other network entities. For simplicity, only three Node Bs 110a, 110b and 110c are shown in FIG. 1. A Node B may be a fixed station used for communicating with the UEs and may also be referred to as an evolved Node B (eNB), a base station, an access point, etc. Each Node B 110 provides communication coverage for a particular geographic area 102. To improve system capacity, the overall coverage area of a Node B may be partitioned into multiple smaller areas, e.g., three smaller areas 104a, 104b and 104c. Each smaller area may be served by a respective Node B subsystem. In 3GPP, the term "cell" can refer to the smallest coverage area of a Node B and/or a Node B subsystem serving this coverage area. In 3GPP2, the term "sector" can refer to the smallest coverage area of a base station and/or a base station subsystem serving this coverage area. For clarity, 3GPP concept of cell is used in the description below.

In the example shown in FIG. 1, each Node B 110 has three cells that cover different geographic areas. For simplicity, FIG. 1 shows the cells not overlapping one another. In a practical deployment, adjacent cells typically overlap one another at the edges, which may allow a UE to receive coverage from one or more cells at any location as the UE moves about the system.

UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a broadcast receiver, etc. A UE may communicate with a Node B via the downlink and uplink. The downlink (or forward link) refers to the communication link from the Node B to the UE, and the uplink (or reverse link) refers to the communication link from the UE to the Node B. In FIG. 1, a solid line with double arrows indicates bi-directional communication between a Node B and a UE. A dashed line with a single arrow indicates a UE receiving a downlink signal from a Node B, e.g., for broadcast and/or multicast services. The terms "UE" and "user" are used interchangeably herein.

The system may support evolved multimedia broadcast/multicast services (E-MBMS) for multiple UEs as well as unicast services for individual UEs. E-MBMS includes point-to-multipoint services that transmit data from a single source to multiple recipients. A service for E-MBMS may be referred to as an E-MBMS service and may be a broadcast service or a multicast service. E-MBMS services may be subscription-based services or freely available services. For simplicity, the term "service" can refer to a broadcast service or a multicast service in the description below.

In LTE, data and overhead information are processed as logical channels at a Radio Link Control (RLC) layer. The logical channels are mapped to transport channels at a Medium Access Control (MAC) layer. The transport channels are mapped to physical channels at a physical layer (PHY). Table 1 lists some logical channels used to support broadcast and multicast services in LTE and provides a short description for each logical channel.

TABLE 1

| Channel | Name | Description |
| --- | --- | --- |
| E-MBMS Scheduling Channel | MSCH | Carry scheduling information for E-MBMS services. |
| E-MBMS Control Channel | MCCH | Carry configuration information for E-MBMS services. |
| E-MBMS Traffic Channel | MTCH | Carry data for E-MBMS services. |

The MSCH, MCCH and MTCH may be used to advertise services, to indicate services being transmitted, and to carry data for the transmitted services. A cell may transmit one or more groups of services over a particular geographic area. There may be one MSCH, one or more MCCHs, and one or more MTCHs for each group of services. For a group of services, the MSCH may carry scheduling information for all services scheduled for transmission in that group. Each MCCH may carry configuration information for one or more services. Each MTCH may carry data for one or more services. The MSCHs for different groups of services may be multiplexed (e.g., in time) within the resources available for sending scheduling information in the cell. For simplicity, much of the following description assumes one MSCH, one MCCH, and one MTCH, which may also be referred to by other names.

As shown in Table 1, different types of overhead information may be sent on different logical channels. The scheduling information may indicate when different services are sent, possibly what radio resources are used to transmit the services, and possibly additional settings associated with those radio resources that may be used by UEs to decode the transmitted services. The configuration information may be used by the UEs to receive the services and may comprise bearer information, mapping of service IDs, higher-layer information, etc. The bearer information may comprise information for bearer configurations such as traffic class, RLC configurations, lower layer settings such as modulation and coding schemes, etc. The higher-layer information may comprise information on which coder/decoder (codec) is used, whether several data streams are bundled for a service (e.g., video bundled with one or more audio tracks), metadata for an application layer, etc. The higher-layer information may be transparent to the lower layers and may be used by the UEs to receive the service. The different types of overhead information shown in Table 1 may also be referred to by other names. The scheduling information may be dynamic whereas the configuration information may be semi-static.

The system may support multiple operational modes for E-MBMS, which may include a multi-cell mode and a single-cell mode. The multi-cell mode may also be referred to as a multicast/broadcast single frequency network (MBSFN). In the multi-cell mode, content for services may be transmitted synchronously across multiple cells. In the single-cell mode, each cell may transmit content for services without synchronization with other cells. Different transport channels may be used for the multi-cell and single-cell modes. For example, a multicast channel (MCH) may carry the MCCHs and MTCHs in the multi-cell mode. A downlink shared channel (DL-SCH) may carry the MTCHs and other logical channels in the single-cell mode. The techniques described herein may be used for the multi-cell mode as well as the single-cell mode.

Figure 2:
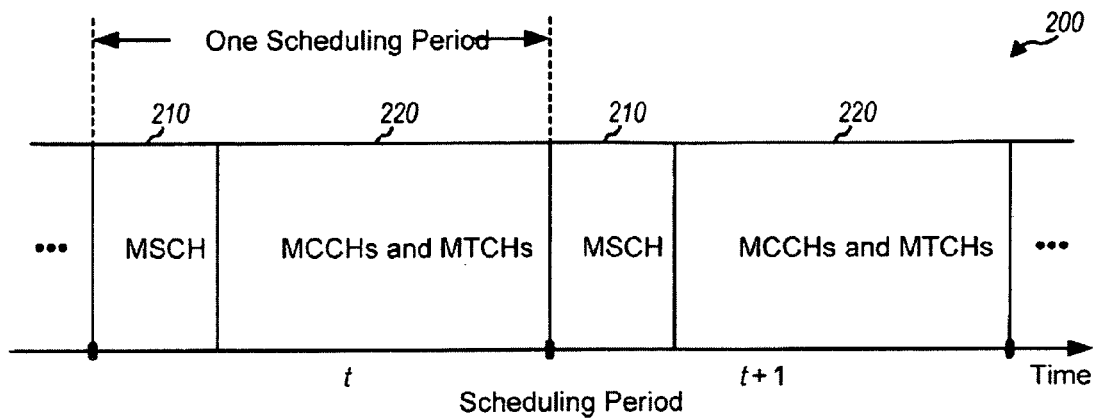
FIG. 2 shows a transmission scheme for broadcast and multicast services.

FIG. 2 shows a design of a transmission scheme 200 for the MSCH, MCCHs and MTCHs. The transmission time line may be partitioned into units of scheduling periods. Each scheduling period may cover a predetermined time duration and may include a predetermined number of subframes. Each subframe may include two slots, and each slot may include a predetermined number of symbol periods. In one design, a subframe may cover 1 millisecond (ms), and a scheduling period may cover 500 ms. A subframe and a scheduling period may also cover other time durations.

In the design shown in FIG. 2, the MSCH may be sent in a first/earlier part 210 of each scheduling period. The MCCHs and MTCHs may be sent in a second/later part 220 of each scheduling period. As shown in FIG. 2, the MSCH may be transmitted periodically in each scheduling period and may carry scheduling information for that scheduling period. The MCCHs may carry configuration information for services and may also be sent in each scheduling period. However, the configuration information may be semi-static and may not need to be received by the UEs in each scheduling period, e.g., unless there is a change in the configuration information.

The system may support services in different categories. Table 2 lists some categories of services that may be supported in accordance with one design.

TABLE 2

| Services | Description |
| --- | --- |
| Advertised services | Services that can be transmitted by a cell. |
| Transmitted services | Services being transmitted by the cell. |
| Scheduled services | Services scheduled for transmission in current scheduling period. |

Figure 3:
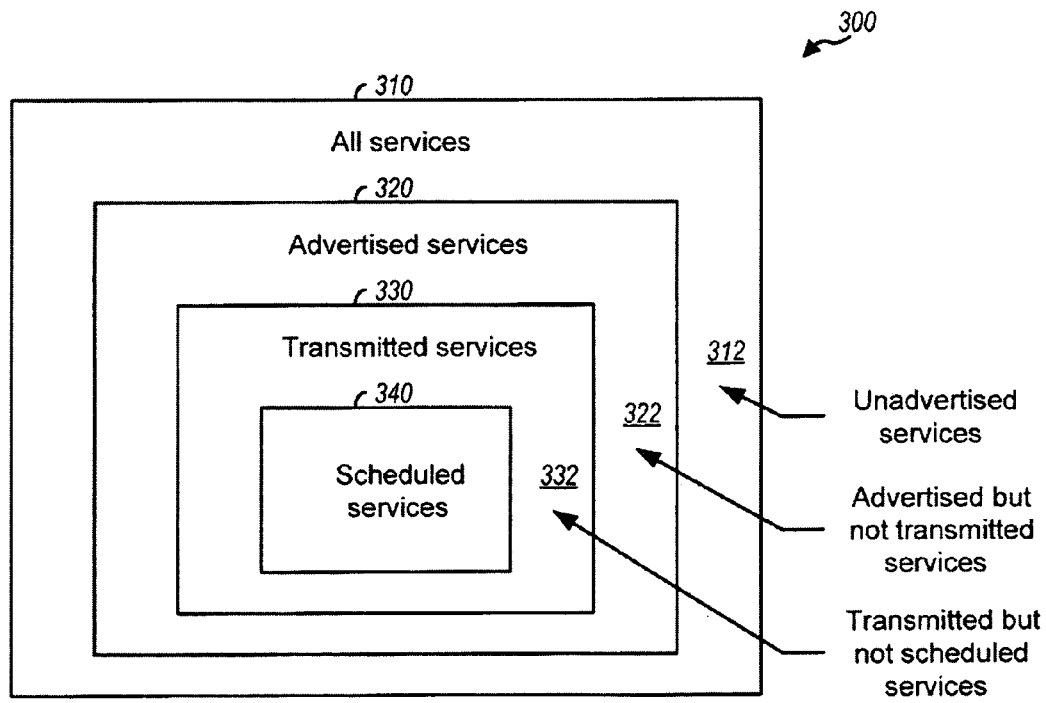
FIG. 3 shows an example Vern diagram for different services.

FIG. 3 shows an example Venn diagram 300 for different categories of services. A box 310 may cover all services that can be supported by the system. A box 320 may cover all advertised services, which may be a subset of all services. A box 330 may cover all transmitted services, which may include all or a subset of the advertised services. A box 340 may cover all scheduled services being sent in the current scheduling period. The scheduled services may include all or a subset of the transmitted services.

An area 312 may include the area inside box 310 but outside box 320. Area 312 may cover unadvertised services, which may be services that can be supported by the system but are not advertised. An area 322 may include the area inside box 320 but outside box 330. Area 322 may cover available services, which may be services that are advertised but not transmitted, e.g., due to lack of interested UEs. The available services may be transmitted if there is sufficient demand for these services. An area 332 may include the area inside box 330 but outside box 340. Area 332 may cover paused services, which may be services that are being transmitted but not scheduled in the current scheduling period. The paused services may include carousel services currently paused between data segments (e.g., a service with a slide show pausing between slides), low data rate services that are transmitted as widely separated bursts, etc.

In general, a given service may be (i) advertised or not advertised, (ii) transmitted or not transmitted, and (iii) scheduled or not scheduled. The service may be in one of eight possible states formed by two possible values for each of the three categories of advertised, transmitted, and scheduled. FIG. 3 shows four possible states for the service. The remaining four possible states may be ignored.

Each service may be identified by a long service ID that may be unique among all services in the system. The long service IDs may be used by the UEs and the system to uniquely identify the services. The long service IDs may be relatively long and may consume much more radio resources to send and receive.

Each advertised service may be assigned a short service ID that may be unique among all advertised services in a cell or a group of cells. The short service IDs may be much shorter than the long service IDs and may be more efficiently used to identify the advertised services. The short service IDs may also be referred to as MSCH IDs, logical channel IDs, etc. The short service IDs may be of a suitable length to provide sufficient addressing space for all advertised services. In the multi-cell mode, the short service IDs may be statically allocated to advertised services across all cells in an MBSFN area, even to cells that are not participating in the transmission of a given service. If these cells begin transmission of the service, then the short service ID for the service would be available.

In an aspect, the MSCH may carry scheduling information comprising a mapping of short service IDs to radio resources used for scheduled services in the current scheduling period. The use of the short service IDs instead of the long service IDs may reduce the amount of scheduling information to be sent and received, which may be beneficial for both the system and the UEs.

The mapping of short service IDs to radio resources may be used to determine which services are scheduled and being transmitted in the current scheduling period. The mapping may also be used to determine the radio resources used for each scheduled service. The radio resources for the scheduled services may be given in various formats. In one design, the radio resources for each scheduled service may comprise one or more resource blocks. Each resource block may comprise a predetermined number of subcarriers (e.g., 12 subcarriers) in one slot. The scheduling information may also include other types of information.

Figure 4:
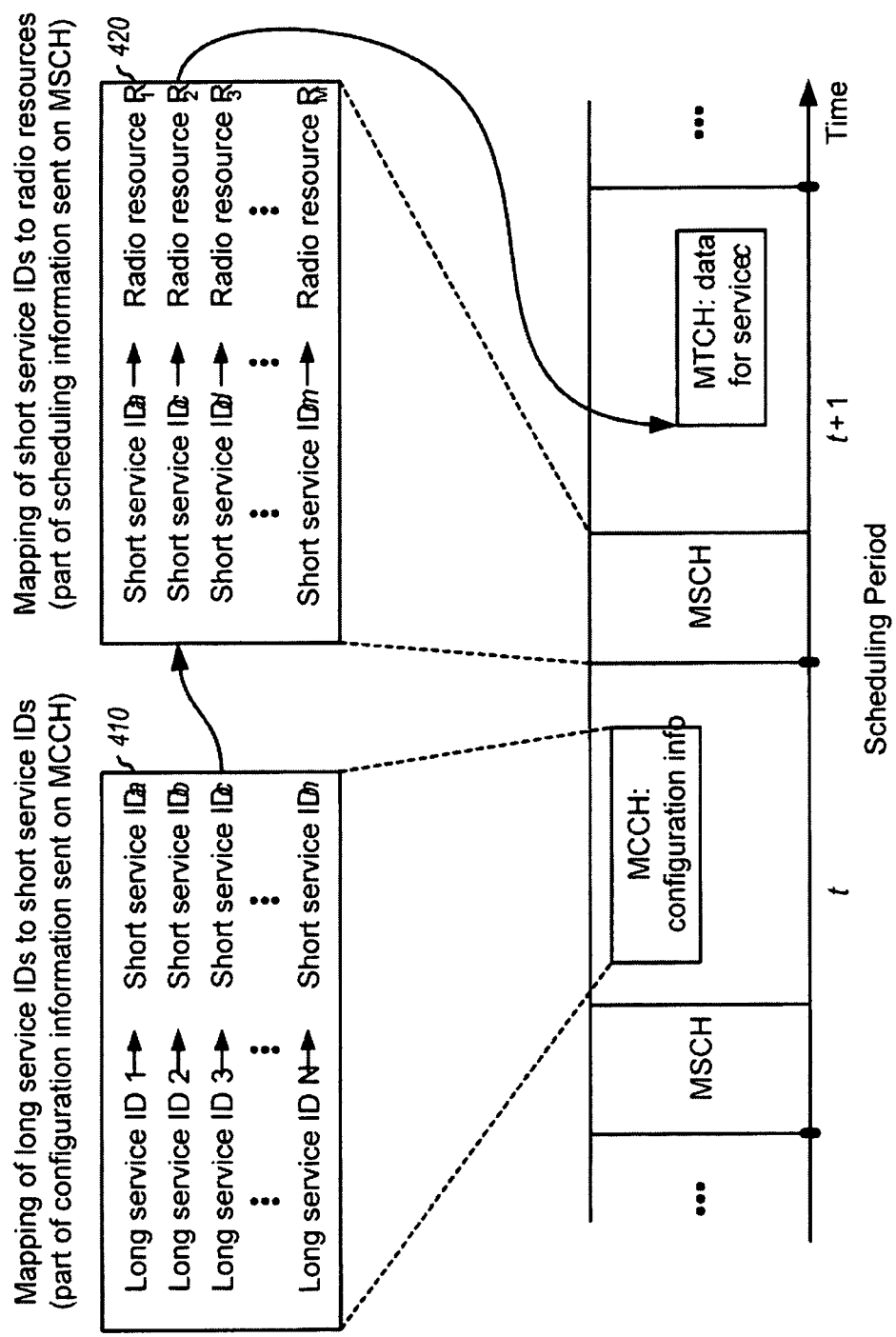
FIG. 4 shows an example mapping of long service IDs to short service IDs and an example mapping of short service IDs to radio resources.

FIG. 4 shows an example mapping 410 of long service IDs to short service IDs. In this example, N long service IDs of 1 through N for N advertised services may be mapped to N short service IDs of a through n, respectively, where N may be any integer value. Mapping 410 may be part of the configuration information sent on the MCCH. Mapping 410 may be unique for a cell or a group of cells and may be different for different cells or different groups of cells. Mapping 410 may be static or semi-static.

FIG. 4 also shows an example mapping 420 of short service IDs to radio resources for one scheduling period. In this example, M short service IDs of a, c, d, . . . , m for M scheduled services may be mapped to M radio resources $R_1$ through $R_M$, respectively, where M may be any integer value equal to or less than N. The M scheduled services in mapping 420 may be a subset of the N advertised services in mapping 410. Mapping 420 may be part of the scheduling information sent on the MSCH in each scheduling period. Mapping 420 may be unique for a cell or a group of cells and may be different for different cells or different groups of cells. Mapping 420 may be dynamic and may change from scheduling period to scheduling period.

The MCCH may carry information identifying advertised services. This information may be referred to as advertised services information and may comprise a list of advertised services or equivalent information. The MSCH may carry information identifying scheduled services. This information may be referred to as scheduled services information and may comprise a list of scheduled services for the current scheduling period or equivalent information.

A UE may receive the advertised services information from the MCCH and the scheduled services information from the MSCH. The UE may be able to identify the scheduled services as well as the advertised services from the received information. However, the UE would not know whether a given service x is (i) advertised but not transmitted or (ii) transmitted but not scheduled in the current scheduling period. It is desirable to be able to distinguish between cases (i) and (ii), which would allow the UE to take appropriate actions. For case (i), the UE may send a request for service x if this service is advertised but not transmitted. For case (ii), the UE may simply wait for service x to be scheduled if this service is already transmitted but not scheduled in the current scheduling period.

In another aspect, information may be sent to convey whether services are transmitted or not transmitted. This information may be referred to as transmitted services information and may be provided in various manners.

In one design, the transmitted services information may comprise an indication for each advertised service. In one design, the indication for an advertised service may be an explicit flag that may be set, e.g., to '1' to indicate that the service is being transmitted or to '0' to indicate that the service is not transmitted.

In another design, the transmitted services information may be implicitly provided by some other information such as the organization of messages or the presence of bearer information. For example, a service may be deemed as being transmitted if bearer information for the service is sent on the MCCH and may be deemed as not transmitted if the bearer information is not sent on the MCCH. A service may also be deemed as being transmitted or not transmitted based on the presence or absence, respectively, of some other information instead of bearer information.

In yet another design, the transmitted services information may comprise a message carrying a list of transmitted services. Each advertised service may be assigned a short service ID as described above. The message may carry a list of short service IDs for services that are being transmitted.

A UE may use the transmitted services information to determine whether or not to send a request for a service of interest to the UE. If the transmitted services information indicates that this service is not being transmitted by a cell, then the UE may send a service request to the cell to indicate interest in the service. The service request may be used to trigger transmission of the service. Conversely, if the transmitted services information indicates that this service is being transmitted, then the UE may avoid sending an unnecessary service request that would waste resources.

In one design, separate messages may be sent for transmitted services and advertised but not transmitted services. For example, the transmitted services may be identified in an MBMS TRANSMITTED SERVICES message. The advertised but not transmitted services may be identified in an MBMS ADVERTISED SERVICES message. These messages may be sent in either order. Sending separate messages for the transmitted services and the advertised but not transmitted services may allow a UE to terminate reading of the MCCH early. For example, the UE may determine that all services of interest to the UE are identified in the first message and may then skip reading the second message. The UE may also skip the remainder of the scheduling period, e.g., if the UE determines that no services of interest to the UE are transmitted in the current scheduling period.

Figure 5:
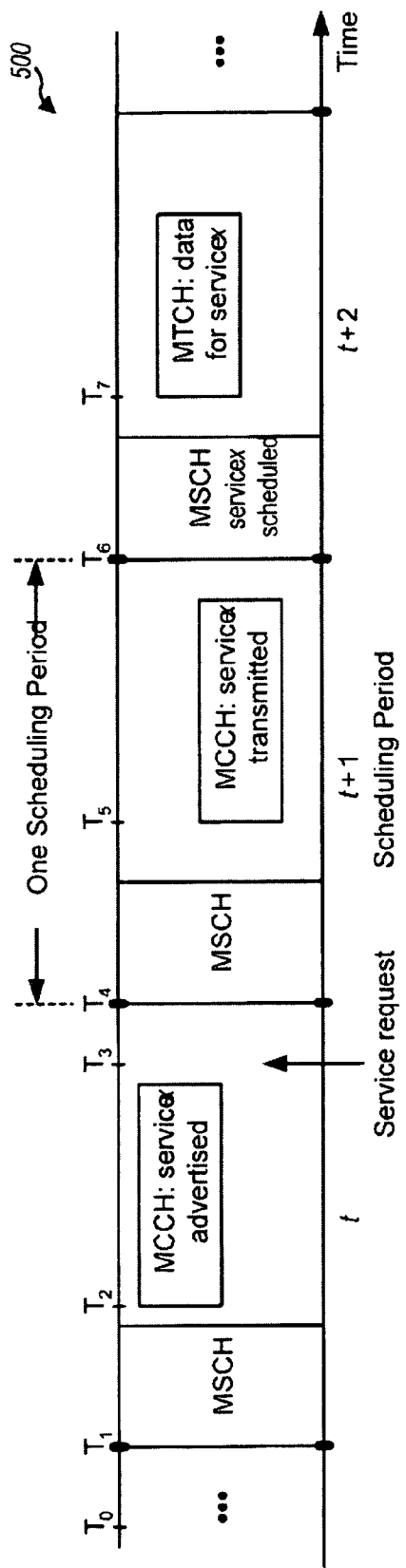
FIG. 5 shows a transmission scheme for supporting advertised services.

FIG. 5 shows a design of a transmission scheme 500 for sending data and overhead information for services. At time $T_0$ prior to scheduling period t, a UE may determine that it is interested in receiving service x. At time $T_1$ at the start of scheduling period t, the UE may receive the MSCH, obtain scheduling information for scheduling period t, and determine the radio resources used for the MCCH. The MCCH may be assigned a predetermined short service ID (e.g., a short service ID of zero) that may be known a priori by all UEs. At time $T_2$, the UE may receive the MCCH and obtain status information, which may comprise information identifying transmitted services and information identifying advertised but not transmitted services. The UE may determine from the status information that service x is advertised but not transmitted. At time $T_3$, the UE may send a request for service x to the cell. The cell may receive the service request from the UE and may decide to start transmitting service x.

At time $T_4$ at the start of scheduling period t+1, the UE may receive the MSCH, obtain scheduling information for scheduling period t+1, and determine the radio resources used for the MCCH. At time $T_5$, the UE may receive the MCCH and obtain status information as well as configuration information for service x. The status information may indicate that service x is being transmitted by the cell. The configuration information may comprise all information needed to receive service x from the MTCH. In one design, the configuration information may comprise the short service ID for service x, bearer information for service x, and possibly other information. The UE may now have all pertinent information to receive service x.

At time $T_6$ at the start of scheduling period t+2, the UE may receive the MSCH, obtain scheduling information for scheduling period t+2, and determine the radio resources used for the MTCH for service x in this scheduling period. At time $T_7$, the UE may receive data for service x from the MTCH.

In the design shown in FIG. 5, the MCCH and MTCH may be sent in any order during a scheduling period. In this design, configuration information for service x may first be sent on the MCCH in scheduling period t+1. Data for service x may then be sent on the MTCH in the following scheduling period t+2. A UE may receive the configuration information for service x in scheduling period t+1 and may use this configuration information to receive the data for service x in scheduling period t+2. In this design, there is an extra scheduling period of latency in starting service x.

In another design that is not shown in FIG. 5, the MCCH may be sent before the MTCH in a scheduling period. In this design, configuration information for service x may be sent on the MCCH in scheduling period t+1. Data for service x may be sent on the MTCH in the same scheduling period t+1 after the configuration information. A UE may first receive the configuration information for service x from the MCCH in scheduling period t+1. The UE may then receive the data for service x from the MTCH in the same scheduling period t+1.

In yet another aspect, configuration information for advertised services may be sent even when these services are not being transmitted. This design may reduce latency in starting a service, as described below. Furthermore, the configuration information may allow UEs to make informed decisions about resource allocations and potential conflicts when determining whether to receive a given service.

Figure 6:
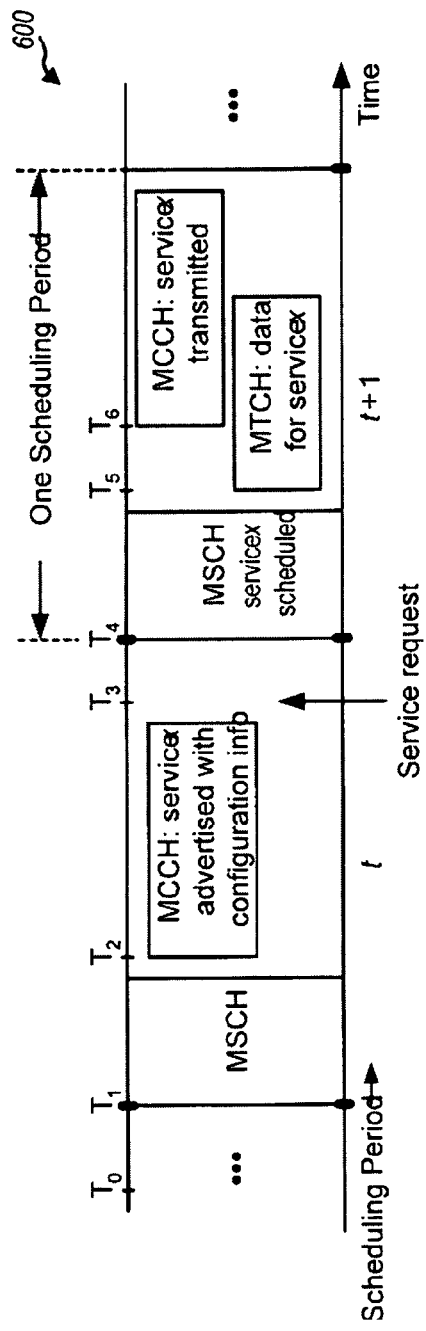
FIG. 6 shows another transmission scheme for supporting advertised services.

FIG. 6 shows a design of a transmission scheme 600 for sending data and overhead information for services. At time $T_0$ prior to scheduling period t, a UE may determine that it is interested in receiving service x. At time $T_1$ at the start of scheduling period t, the UE may receive the MSCH, obtain scheduling information for scheduling period t, and determine the radio resources used for the MCCH. At time $T_2$, the UE may receive the MCCH, obtain status information, and determine that service x is advertised but not transmitted. The MCCH may carry configuration information for all advertised services, and the UE may receive configuration information for service x from the MCCH in scheduling period t. At time $T_3$, the UE may send a request for service x to the cell. The cell may receive the service request from the UE and may decide to start transmitting service x.

At time $T_4$ at the start of scheduling period t+1, the UE may receive the MSCH, obtain scheduling information for scheduling period t+1, and determine the radio resources used for the MTCH for service x in this scheduling period. At time $T_5$, the UE may receive data for service x from the MCCH based on the configuration information for service x received from the MCCH in the prior scheduling period t. The UE may not need to receive the MCCH sent at time $T_6$ in scheduling period t+1.

In scheduling period t+1, the MCCH may carry status information indicating that service x is being transmitted. This status information may be used by other UEs to receive service x. Another UE interested in receiving service x may receive the MSCH at time $T_4$, receive the MCCH at time $T_6$, and determine that service x is transmitted. The UE may obtain configuration information for service x from the MCCH in scheduling period t+1. The UE may then receive the MSCH in the next scheduling period t+2, determine the radio resources used for the MTCH for service x, and receive data for service x based on the configuration information received in scheduling period t+1. Alternatively, the UE may buffer samples for scheduling period t+1, receive the MSCH and MCCH, determine that service x is transmitted, and obtain the configuration information for service x. The UE may then reread the MSCH, determine the radio resources used for the MTCH for service x in scheduling period t+1, and then receive data for service x based on the configuration information received in this scheduling period.

The design in FIG. 6 may allow a UE to begin receiving a requested service in the first scheduling period after sending a service request. This may be achieved by sending configuration information for advertised services in each symbol period. The configuration information for each advertised service may then be available for use in the next scheduling period if needed.

Efficient reception of services by UEs may be achieved with the following:
Send on the MSCH scheduling information comprising a mapping of short service IDs to radio resources used for scheduled services in the current scheduling period;
Send on the MCCH a mapping of long service IDs to short service IDs for advertised services;
Send on the MCCH status information identifying transmitted services and advertised but not transmitted services, e.g., in separate messages; and
Send on the MCCH configuration information for advertised services, including those that are not transmitted.

With the above features, a service request procedure may be uncomplicated and efficient. A UE that is interested in a given advertised but not transmitted service may send a service request and may immediately begin monitoring the MSCH for the short service ID of that service. The cell may move the service from the list of advertised but not transmitted services to the list of transmitted services on the MCCH. This change may be principally for the benefit of other UEs arriving in the cell. The UE that issued the service request may already know to begin monitoring the MSCH for the short service ID of the requested service.

Figures 7, 8:
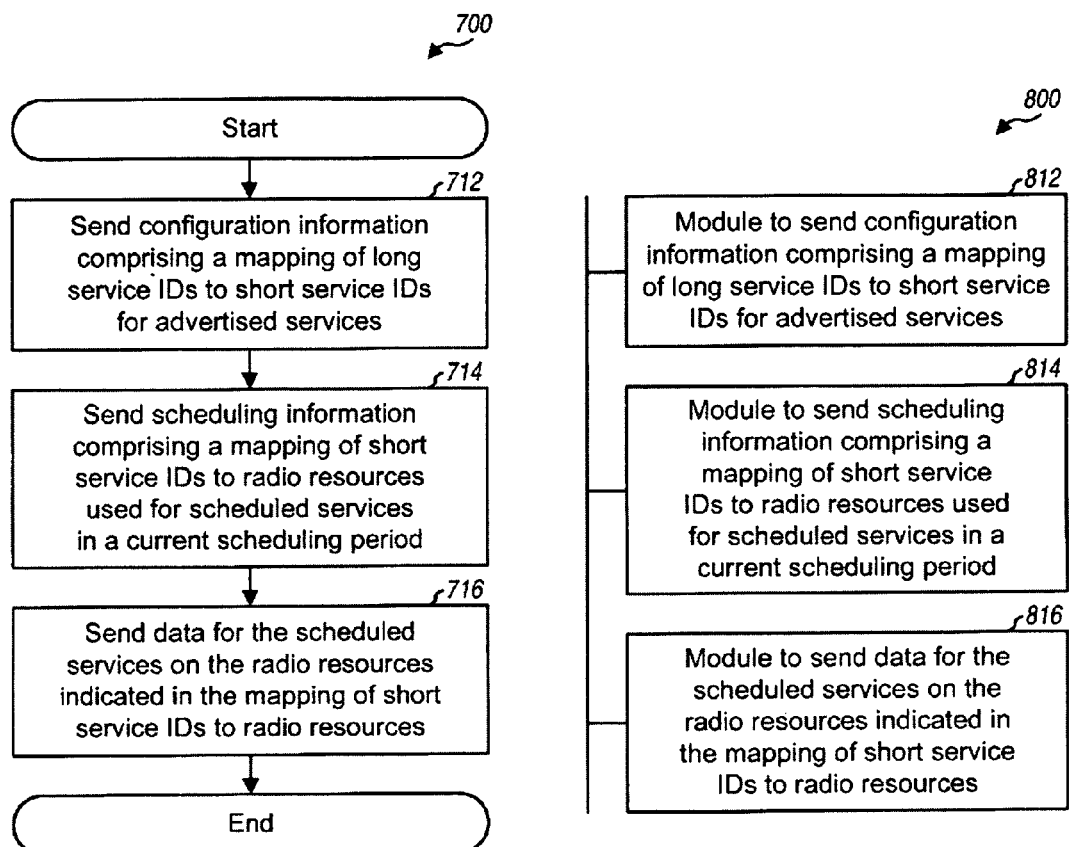
FIGS. 7 and 8 show a process and an apparatus, respectively, for sending configuration information and scheduling information for services.

FIG. 7 shows a design of a process 700 for sending broadcast and multicast services in a wireless communication system. Process 700 may be performed by a transmitter such as a Node B or some other entity. The transmitter may send configuration information comprising a mapping of long service IDs to short service IDs for advertised services (block 712). The transmitter may send scheduling information comprising a mapping of short service IDs to radio resources used for scheduled services in a current scheduling period (block 714). The transmitter may send data for the scheduled services on the radio resources indicated in the mapping of short service IDs to radio resources (block 716). The long service IDs may be used to identify all supported services in the system. The short service IDs may be used to identify scheduled services in the scheduling information. The advertised services may be a subset of the supported services, and the scheduled services may be a subset of the advertised services. The transmitter may send the scheduling information on a scheduling channel, the configuration information on a control channel, and data for the scheduled services on a traffic channel.

FIG. 8 shows a design of an apparatus 800 for sending broadcast and multicast services in a wireless communication system. Apparatus 800 includes a module 812 to send configuration information comprising a mapping of long service IDs to short service IDs for advertised services, a module 814 to send scheduling information comprising a mapping of short service IDs to radio resources used for scheduled services in a current scheduling period, and a module 816 to send data for the scheduled services on the radio resources indicated in the mapping of short service IDs to radio resources.

FIG. 9 shows a design of a process 900 for receiving broadcast and multicast services in a wireless communication system. Process 900 may be performed by a receiver such as a UE or some other entity. The receiver may receive configuration information comprising a mapping of long service IDs to short service IDs for advertised services (block 912). The receiver may determine a short service ID for a selected service based on the mapping of long service IDs to short service IDs (block 914).

The receiver may receive scheduling information comprising a mapping of short service IDs to radio resources used for scheduled services in a current scheduling period (block 916). The receiver may determine whether the selected service is scheduled in the current scheduling period based on the short service ID for the selected service and the scheduling information. The receiver may identify the selected service among the scheduled services in the current scheduling period (block 918). The receiver may determine radio resources used for the selected service based on the mapping of short service IDs to radio resources (block 920). The receiver may then receive data for the selected service from the radio resources used for the selected service (block 922).

The receiver may perform blocks 912 and 914 in one scheduling period and may perform blocks 916 to 922 in another scheduling period. The receiver may receive the scheduling information from a scheduling channel, the configuration information from a control channel, and data for the selected service from a traffic channel.

FIG. 10 shows a design of an apparatus 1000 for receiving broadcast and multicast services in a wireless communication system. Apparatus 1000 includes a module 1012 to receive configuration information comprising a mapping of long service IDs to short service IDs for advertised services, a module 1014 to determine a short service ID for a selected service based on the mapping of long service IDs to short service IDs, a module 1016 to receive scheduling information comprising a mapping of short service IDs to radio resources used for scheduled services in a current scheduling period, a module 1018 to identify the selected service among the scheduled services in the current scheduling period, a module 1020 to determine radio resources used for the selected service based on the mapping of short service IDs to radio resources, and a module 1022 to receive data for the selected service from the radio resources used for the selected service.

FIG. 11 shows a design of a process 1100 for sending broadcast and multicast services in a wireless communication system. Process 1100 may be performed by a transmitter such as a Node B or some other entity. The transmitter may maintain at least one list for services being transmitted and services being advertised but not transmitted (block 1112). The transmitter may send information identifying the services being transmitted and the services being advertised but not transmitted (block 1114). In one design, the transmitter may set an indication for each advertised service to indicate whether that advertised service is transmitted or not transmitted. The transmitter may then generate the information to include the indications for all advertised services. In one design, the transmitter may generate a first message comprising information identifying the services being transmitted. The transmitter may also generate a second message comprising information identifying the services being advertised but not transmitted. The transmitter may then send the first and second messages.

The transmitter may also send information identifying services being advertised and information identifying services scheduled for transmission in a current scheduling period. The services being advertised may comprise the services being transmitted as well as the services being advertised but not transmitted. The services being transmitted may comprise the services scheduled for transmission.

The transmitter may receive a request for a service being advertised but not transmitted (block 1116). The transmitter may start transmission of the requested service (block 1118). The transmitter may update the at least one list for the services being transmitted and the services being advertised but not transmitted to reflect transmission of the requested service (block 1120). The transmitter may send updated information identifying the services being transmitted and the services being advertised but not transmitted (block 1122).

FIG. 12 shows a design of an apparatus 1200 for sending broadcast and multicast services in a wireless communication system. Apparatus 1200 includes a module 1212 to maintain at least one list for services being transmitted and services being advertised but not transmitted, a module 1214 to send information identifying the services being transmitted and the services being advertised but not transmitted, a module 1216 to receive a request for a service being advertised but not transmitted, a module 1218 to start transmission of the requested service, a module 1220 to update the at least one list for the services being transmitted and the services being advertised but not transmitted to reflect transmission of the requested service, and a module 1222 to send updated information identifying the services being transmitted and the services being advertised but not transmitted.

Figure 13:
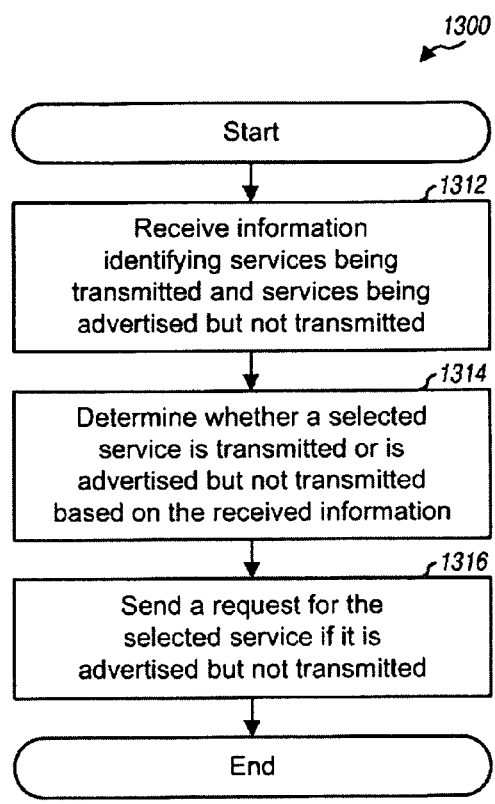
FIGS. 13 and 14 show a process and an apparatus, respectively, for receiving information identifying services being advertised but not transmitted.

FIG. 13 shows a design of a process 1300 for receiving broadcast and multicast services in a wireless communication system. Process 1300 may be performed by a receiver such as a UE or some other entity. The receiver may receive information identifying services being transmitted and services being advertised but not transmitted (block 1312). The receiver may determine whether a selected service is transmitted or is advertised but not transmitted based on the received information (block 1314). The receiver may send a request for the selected service if it is advertised but not transmitted (block 1316).

In one design, the receiver may obtain indications for advertised services from the received information. The indication for each advertised service may indicate whether that advertised service is transmitted or not transmitted. The receiver may then determine whether the selected service is transmitted or is advertised but not transmitted based on the indication for the selected service. In one design, the receiver may receive a first message comprising information identifying the services being transmitted. The receiver may determine whether the selected service is among the services being transmitted. If the selected service is not among the services being transmitted, then the receiver may receive a second message comprising information identifying the services being advertised but not transmitted. In another design, the receiver may receive the second message comprising information identifying the services being advertised but not transmitted. The receiver may determine whether the selected service is among the services being advertised but not transmitted. If the selected service is not among the services being advertised but not transmitted, then the receiver may the first message comprising information identifying the services being transmitted. In any case, the receiver may receive one message at a time and may terminate early if the selected service is found in a received message.

Figure 14:
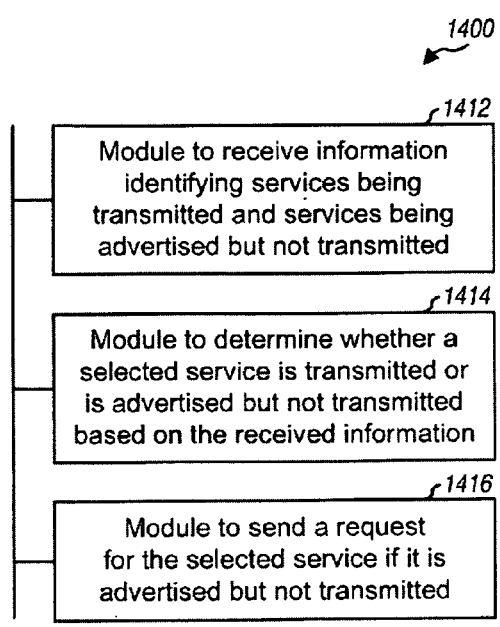

FIG. 14 shows a design of an apparatus 1400 for receiving broadcast and multicast services in a wireless communication system. Apparatus 1400 includes a module 1412 to receive information identifying services being transmitted and services being advertised but not transmitted, a module 1414 to determine whether a selected service is transmitted or is advertised but not transmitted based on the received information, and a module 1416 to send a request for the selected service if it is advertised but not transmitted.

FIG. 15 shows a design of a process 1500 for sending broadcast and multicast services in a wireless communication system. Process 1500 may be performed by a transmitter such as a Node B or some other entity. The transmitter may send status information identifying services being advertised (block 1512). The transmitter may generate configuration information (e.g., comprising a service ID and bearer information) for each service being advertised but not transmitted (block 1514). The bearer information for each service may be used to receive that service if it is transmitted. The transmitter may send the configuration information for the services being advertised but not transmitted (block 1516).

The transmitter may receive a request for a service being advertised but not transmitted in a first scheduling period (block 1518). The transmitter may start transmission of the requested service in a second scheduling period, e.g., immediately following the first scheduling period (block 1520).

FIG. 16 shows a design of an apparatus 1600 for sending broadcast and multicast services in a wireless communication system. Apparatus 1600 includes a module 1612 to send status information identifying services being advertised, a module 1614 to generate configuration information for each service being advertised but not transmitted, a module 1616 to send the configuration information for the services being advertised but not transmitted, a module 1618 to receive a request for a service being advertised but not transmitted in a first scheduling period, and a module 1620 to start transmission of the requested service in a second scheduling period, e.g., immediately following the first scheduling period.

FIG. 17 shows a design of a process 1700 for receiving broadcast and multicast services in a wireless communication system. Process 1700 may be performed by a receiver such as a UE or some other entity. The receiver may receive configuration information for a selected service being advertised but not transmitted in a first scheduling period (block 1712). The receiver may obtain a service ID and bearer information for the selected service from the configuration information (block 1714). The receiver may send a request for the selected service in the first scheduling period (block 1716).

The receiver may receive scheduling information for a second scheduling period, which may be immediately following the first scheduling period (block 1718). The receiver may determine radio resources used for the selected service in the second scheduling period based on the service ID for the selected service and the scheduling information (block 1720). The receiver may then receive data for the selected service in the second scheduling period based on the configuration information received in the first scheduling period (block 1722). The receiver may receive the data for the selected service from the radio resources used for the selected service and based on the bearer information.

FIG. 18 shows a design of an apparatus 1800 for receiving broadcast and multicast services in a wireless communication system. Apparatus 1800 includes a module 1812 to receive configuration information for a selected service being advertised but not transmitted in a first scheduling period, a module 1814 to obtain a service ID and bearer information for the selected service from the configuration information, a module 1816 to send a request for the selected service in the first scheduling period, a module 1818 to receive scheduling information for a second scheduling period, which may be immediately following the first scheduling period, a module 1820 to determine radio resources used for the selected service in the second scheduling period based on the service ID for the selected service and the scheduling information, and a module 1822 to receive data for the selected service in the second scheduling period based on the configuration information received in the first scheduling period.

The modules in FIGS. 8, 10, 12, 14, 16 and 18 may comprise processors, electronics devices, hardware devices, electronics components, logical circuits, memories, etc., or any combination thereof.

Figure 19:
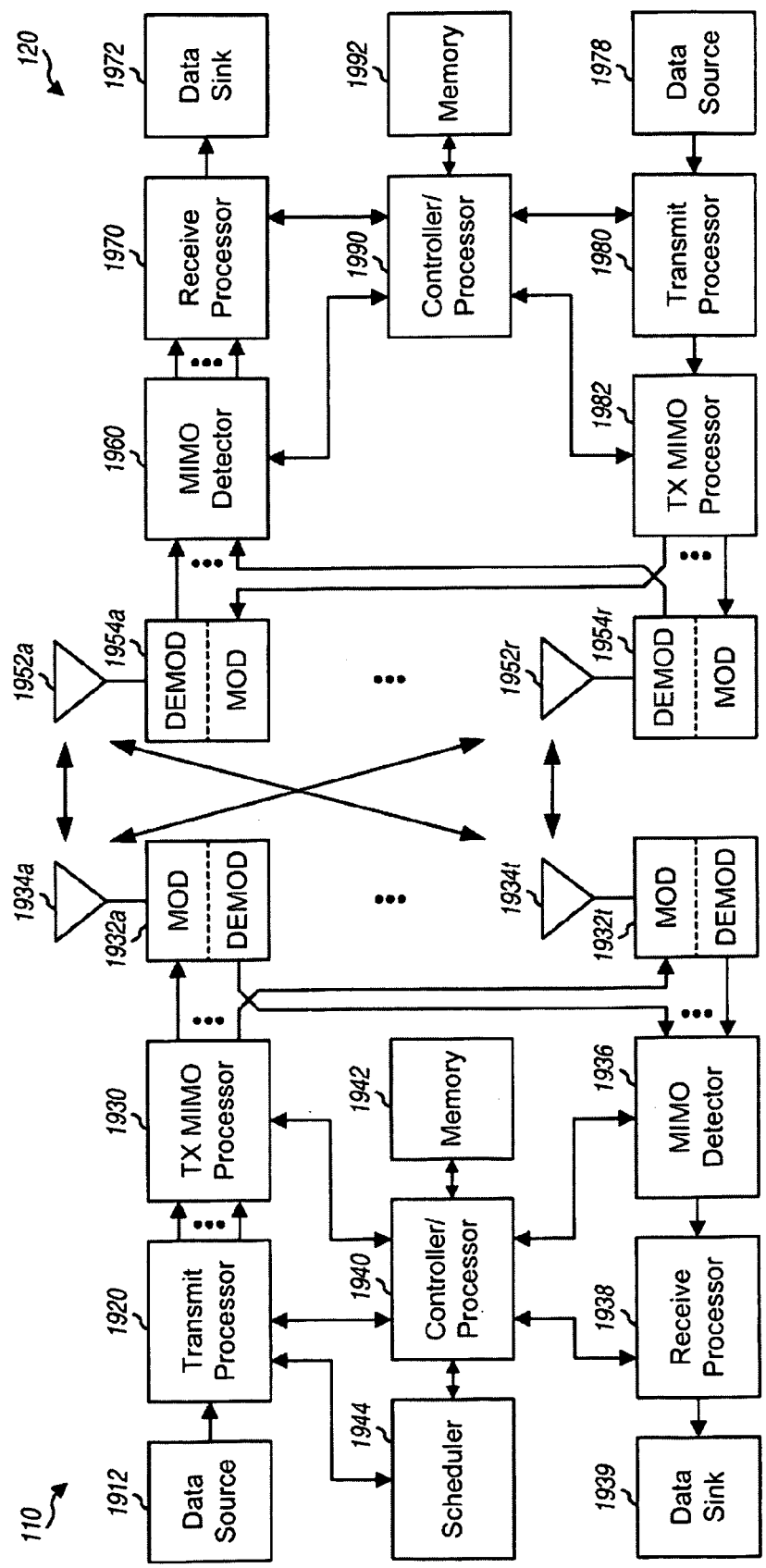
FIG. 19 shows a block diagram of a Node B and a UE.

FIG. 19 shows a block diagram of a design of Node B 110 and UE 120, which may be one of the Node Bs and one of the UEs in FIG. 1. In this design, Node B 110 is equipped with T antennas 1934a through 1934t, and UE 120 is equipped with R antennas 1952a through 1952r, where in general T≥1 and R≥1.

At Node B 110, a transmit processor 1920 may receive data for broadcast, multicast and/or unicast services from a data source 1912. Transmit processor 1920 may process the data for each service to obtain data symbols. Transmit processor 1920 may also receive scheduling information, configuration information and/or other overhead information from a controller/processor 1940 and/or a scheduler 1944. Transmit processor 1920 may process the overhead information and provide overhead symbols. A transmit (TX) multiple-input multiple-output (MIMO) processor 1930 may multiplex the data symbols and the overhead symbols with pilot symbols, process (e.g., precode) the multiplexed symbols, and provide T output symbol streams to T modulators (MOD) 1932a through 1932t. Each modulator 1932 may process a respective output symbol stream (e.g., for OFDM) to obtain an output sample stream. Each modulator 1932 may further process (e.g., convert to analog, amplify, filter, and upconvert) the output sample stream to obtain a downlink signal. T downlink signals from modulators 1932a through 1932t may be transmitted via T antennas 1934a through 1934t, respectively.

At UE 120, antennas 1952a through 1952r may receive the downlink signals from Node B 110 and provide received signals to demodulators (DEMOD) 1954a through 1954r, respectively. Each demodulator 1954 may condition (e.g., filter, amplify, downconvert, and digitize) a respective received signal to obtain received samples and may further process the received samples (e.g., for OFDM) to obtain received symbols. A MIMO detector 1960 may receive and process the received symbols from all R demodulators 1954a through 1954r and provide detected symbols. A receive processor 1970 may process the detected symbols, provide decoded data for services of interest to a data sink 1972, and provide decoded overhead information to a controller/processor 1990. In general, the processing by MIMO detector 1960 and receive processor 1970 is complementary to the processing by TX MIMO processor 1930 and transmit processor 1920 at Node B 110.

On the uplink, at UE 120, data from a data source 1978 and control information (e.g., requests for services) from a controller/processor 1990 may be processed by a transmit processor 1980, precoded by a TX MIMO processor 1982 (if applicable), conditioned by modulators 1954a through 1954r, and transmitted via antennas 1952a through 1952r. At Node B 110, the uplink signals from UE 120 may be received by antennas 1934, conditioned by demodulators 1932, detected by a MIMO detector 1936, and processed by a receive processor 1938 to obtain the data and overhead information transmitted by UE 120.

Controllers/processors 1940 and 1990 may direct the operation at Node B 110 and UE 120, respectively. Controller/processor 1940 may implement or direct process 700 in FIG. 7, process 1100 in FIG. 11, process 1500 in FIG. 15, and/or other processes for the techniques described herein. Controller/processor 1990 may implement or direct process 900 in FIG. 9, process 1300 in FIG. 13, process 1700 in FIG. 17, and/or other processes for the techniques described herein. Memories 1942 and 1992 may store data and program codes for Node B 110 and UE 120, respectively. Scheduler 1944 may schedule UEs for downlink and/or uplink transmission, schedule transmission of broadcast and multicast services, and provide assignments of radio resources for the scheduled UEs and services. Controller/processor 1940 and/or scheduler 1944 may generate scheduling information and/or overhead information for the broadcast and multicast services.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   at a control layer, sending scheduling information to a user equipment (UE) before or at the start of a current scheduling period comprising a first mapping of short service identifiers (IDs) to corresponding radio resources used exclusively for all scheduled multicast or broadcast services in the current scheduling period, the short service IDs statically allocated to advertised services across all cells in a multicast/broadcast single frequency network (MBSFN) area;
   sending configuration information to the UE comprising a second mapping between the short service IDs of the first mapping and long service IDs for advertised services in the current scheduling period; and
   sending data for the scheduled services on the radio resources indicated in the first mapping.

2. The method of claim 1, wherein the long service IDs are used to identify all supported services, wherein the short service IDs are used to identify the scheduled services in the scheduling information, wherein the advertised services are a subset of the supported services, and wherein the scheduled services are a subset of the advertised services.

3. The method of claim 1, wherein sending the scheduling information comprises sending the scheduling information on a scheduling channel, wherein the sending the configuration information comprises sending the configuration information on a control channel, and wherein the sending data comprises sending data for the scheduled services on a traffic channel.

4. An apparatus for wireless communication, comprising:
   at least one processor configured to:
   send, at a control layer, scheduling information to a user equipment (UE) before or at the start of a current scheduling period, comprising a first mapping of short service identifiers (IDs) to corresponding radio resources used exclusively for all scheduled multicast or broadcast services in the current scheduling period, the short service IDs statically allocated to advertised services across all cells in a multicast/broadcast single frequency network (MBSFN) area;
   send configuration information to the UE comprising a second mapping between the short service IDs of the first mapping and long service IDs for advertised services in the current scheduling period; and
   send data for the scheduled services on the radio resources indicated in the first mapping.

5. An apparatus for wireless communication, comprising:
   means for sending, at a control layer, scheduling information to a user equipment (UE) before or at the start of a current scheduling period, comprising a first mapping of short service identifiers (IDs) to corresponding radio resources used exclusively for all scheduled multicast or broadcast services in the current scheduling period, the short service IDs statically allocated to advertised services across all cells in a multicast/broadcast single frequency network (MBSFN) area;
   means for sending configuration information to the UE comprising a second mapping between the short service IDs of the first mapping and long service IDs for advertised services in the current scheduling period; and
   means for sending data for the scheduled services on the radio resources indicated in the first mapping.

6. A computer program product, comprising:
   a non-transitory computer-readable medium comprising:
   code for causing at least one computer to send, at a control layer, scheduling information to a user equipment (UE) before or at the start of a current scheduling period, comprising a first mapping of short service identifiers (IDs) to corresponding radio resources used exclusively for all scheduled multicast or broadcast services in the current scheduling period, the short service IDs statically allocated to advertised services across all cells in a multicast/broadcast single frequency network (MBSFN) area, code for causing the at least one computer to send configuration information to the UE comprising a second mapping between the short service IDs of the first mapping and long service IDs for advertised services in the current scheduling period, and code for causing the at least one computer to send data for the scheduled services on the radio resources indicated in the first mapping.

7. A method for wireless communication, comprising:
receiving, at a user equipment (UE) at a control layer, before or at the start of a current scheduling period, scheduling information comprising a first mapping of short service identifiers (IDs) to corresponding radio resources used exclusively for all scheduled multicast or broadcast services in the current scheduling period, the short service IDs statically allocated to advertised services across all cells in a multicast/broadcast single frequency network (MBSFN) area;
identifying a selected service among the scheduled services in the current scheduling period;
determining radio resources used for the selected service based on the first mapping;
receiving configuration information at the UE comprising a second mapping of long service IDs to short service IDs for advertised services in the current scheduling period; and
receiving data for the selected service from the radio resources used for the selected service.

8. The method of claim 7, further comprising:
determining a short service ID for the selected service based on the second mapping; and
determining whether the selected service is scheduled in the current scheduling period based on the short service ID for the selected service and the scheduling information.

9. The method of claim 8, wherein receiving the scheduling information comprises receiving the scheduling information from a scheduling channel, wherein the receiving the configuration information comprises receiving the configuration information from a control channel, and wherein the receiving data comprises receiving data for the selected service from a traffic channel.

10. An apparatus for wireless communication, comprising:
at least one processor configured to:
receive, at a control layer, before or at the start of a current scheduling period, scheduling information comprising a first mapping of short service identifiers (IDs) to corresponding radio resources used exclusively for all scheduled multicast or broadcast services in the current scheduling period, the short service IDs statically allocated to advertised services across all cells in a multicast/broadcast single frequency network (MBSFN) area, to identify a selected service among the scheduled services in the current scheduling period;
determine radio resources used for the selected service based on the first mapping;
receive configuration information comprising a second mapping of long service IDs to short service IDs for advertised services in the current scheduling period; and receive data for the selected service from the radio resources used for the selected service.

11. The apparatus of claim 10, wherein the at least one processor is further configured to:
determine a short service ID for the selected service based on the second mapping; and
determine whether the selected service is scheduled in the current scheduling period based on the short service ID for the selected service and the scheduling information.

12. A method for wireless communication, comprising:
maintaining, at an entity of a wireless communication network, at least one list identifying services being transmitted and services being advertised but not transmitted, wherein the transmitted services include scheduled services;
at a control layer, sending, by the entity to one or more terminals in a cell serviced by the entity before or at the start of a current scheduling period, scheduling information that includes a first mapping of short service identifiers (IDs) to radio resources used exclusively for all scheduled services in the current scheduling period, the short service IDs statically allocated to advertised services across all cells in a multicast/broadcast single frequency network (MBSFN) area;
maintaining, by the entity, a second mapping between the short service IDs of the first mapping and long service IDs for advertised services; and
sending, by the entity to the one or more terminals separately from the first mapping, information including short service IDs identifying the services being transmitted and the services being advertised but not transmitted.

13. The method of claim 12, further comprising:
setting an indication for each advertised service to indicate whether the advertised service is transmitted or not transmitted; and
generating the information comprising indications for all advertised services.

14. The method of claim 12, further comprising:
receiving a request for a service being advertised but not transmitted;
starting transmission of the requested service; and
updating the at least one list for the services being transmitted and the services being advertised but not transmitted to reflect transmission of the requested service.

15. The method of claim 12, further comprising:
sending information identifying services being advertised, wherein the services being advertised comprise the services being transmitted and the services being advertised but not transmitted.

16. The method of claim 12, further comprising:
sending information identifying services scheduled for transmission in a current scheduling period, wherein the services being transmitted comprise the services scheduled for transmission.

17. An apparatus for wireless communication, comprising:
at least one processor of an entity of a wireless communication network configured to:
maintain at least one list identifying services being transmitted and services being advertised but not transmitted, wherein the transmitted services include scheduled services;
send, at a control layer by the entity to one or more terminals in a cell serviced by the entity, before or at the start of a current scheduling period, scheduling information that includes a first mapping of short service identifiers (IDs) to radio resources used exclusively for all scheduled services in a current scheduling period, the short service IDs statically allocated to advertised services across all cells in a multicast/broadcast single frequency network (MBSFN) area;

maintaining, by the entity, a second mapping between the short service IDs of the first mapping and long service IDs for advertised services in the current scheduling period; and send to the one or more terminals separately from the first mapping, information including short service IDs identifying the services being transmitted and the services being advertised but not transmitted.

18. The apparatus of claim 17, wherein the at least one processor is configured to set an indication for each advertised service to indicate whether the advertised service is transmitted or not transmitted, and to generate the information comprising indications for all advertised services.

19. The apparatus of claim 17, wherein the at least one processor is configured to receive a request for a service being advertised but not transmitted, to start transmission of the requested service, and to update the at least one list for the services being transmitted and the services being advertised but not transmitted to reflect transmission of the requested service.

20. A method for wireless communication, comprising:
receiving, in a first message, by an entity of a wireless communication network from a network entity servicing a cell in which the entity is presently located, information including short service identifiers (IDs) identifying services being transmitted, wherein the transmitted services include scheduled services;

receiving, by the entity, in a second message separate from the first message information including short service IDs identifying services being advertised but not transmitted;

at a control layer, receiving, before or at the start of a current scheduling period, scheduling information that includes a first mapping of the short service IDs to radio resources used exclusively for all scheduled services in the current scheduling period, the short service IDs statically allocated to advertised services across all cells in a multicast/broadcast single frequency network (MBSFN) area;

receiving configuration information including a second mapping between the short service IDs of the first mapping and long service IDs for advertised services in the current scheduling period;

determining whether a selected service is transmitted or is advertised but not transmitted based on the first and second messages; and sending a request for the selected service if the selected service is advertised but not transmitted.

21. The method of claim 20, wherein the determining comprises
determining, upon receiving the first message, whether the selected service is among the services being transmitted, and wherein the receiving comprises receiving the second message if the selected service is not among the services being transmitted.

22. The method of claim 20, wherein determining whether a selected service is transmitted or is advertised but not transmitted comprises:
determining, upon receiving the second message, whether the selected service is among the services being advertised but not transmitted, and
wherein the receiving comprises receiving the first message if the selected service is not among the services being advertised but not transmitted.

23. The method of claim 20, further comprising:
obtaining from the received information an indication for each advertised service indicating whether the advertised service is transmitted or not transmitted.

24. An apparatus for wireless communication, comprising:
at least one processor of an entity of a wireless communication network configured to:
receive, from a network entity servicing a cell in which the entity is presently located, in a first message, information including short service identifiers (IDs) identifying services being transmitted, wherein the transmitted services include scheduled services;

receive, in a second message separate from the first message, information including short service IDs identifying services being advertised but not transmitted;

receive, at a control layer, before or at the start of a current scheduling period, scheduling information that includes a first mapping of short service identifiers (IDs) to radio resources used exclusively for all scheduled services in the current scheduling period, the short service IDs statically allocated to advertised services across all cells in a multicast/broadcast single frequency network (MBSFN) area;

receive configuration information including a second mapping between the short service IDs of the first mapping and long service IDs for advertised services in the current scheduling period;

determine whether a selected service is transmitted or is advertised but not transmitted based on the first and second messages; and send a request for the selected service if the selected service is advertised but not transmitted.

25. The apparatus of claim 24, wherein the at least one processor is configured to determine, upon receiving the first message, whether the selected service is among the services being transmitted, and to receive the second message if the selected service is not among the services being transmitted.

26. The apparatus of claim 24, wherein the at least one processor is configured to obtain from the received information an indication for each advertised service indicating whether the advertised service is transmitted or not transmitted.

* * * * *